N. BRAIBANT.
ANTIFRICTION BEARING FOR RESILIENT WHEELS.
APPLICATION FILED DEC. 9, 1910.
1,044,739.
Patented Nov. 19, 1912.
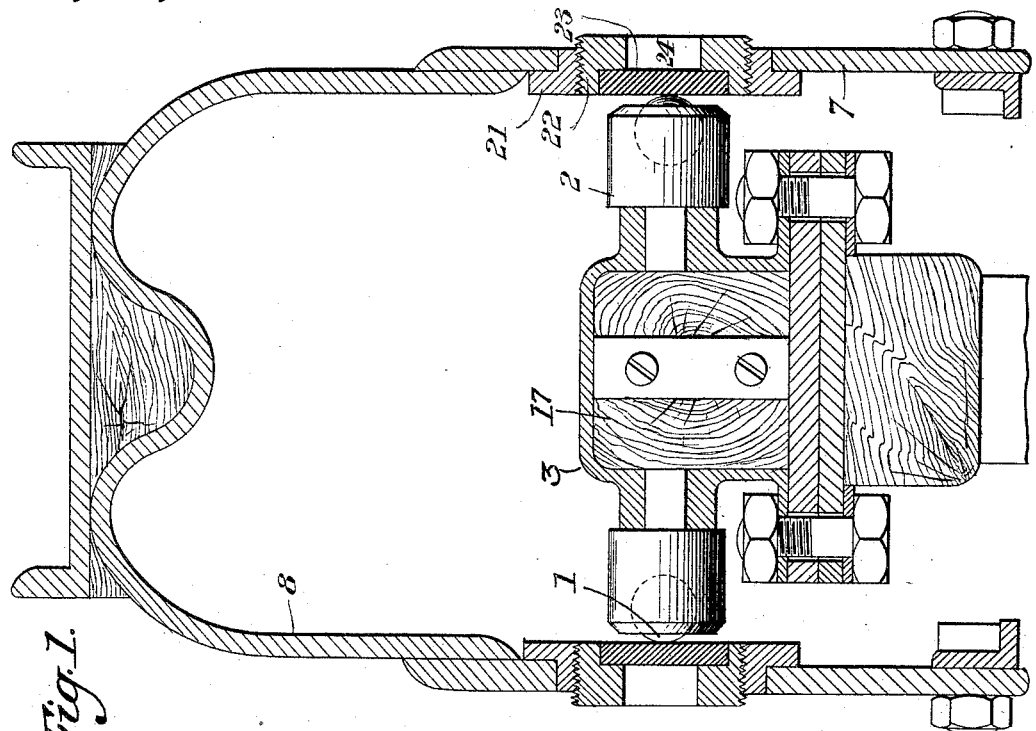
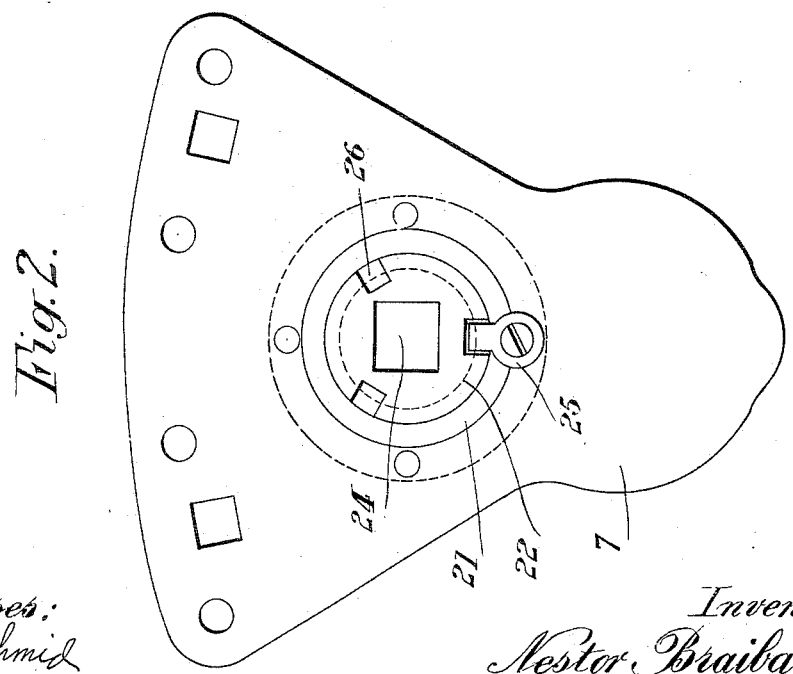
Witnesses:
M. Schmid
L. Lang
Inventor:
Nestor Braibant
by B. Singer
Attorney

UNITED STATES PATENT OFFICE.

NESTOR BRAIBANT, OF BRUSSELS, BELGIUM.

ANTIFRICTION-BEARING FOR RESILIENT WHEELS.

1,044,739. Specification of Letters Patent. Patented Nov. 19, 1912.

Application filed December 9, 1910. Serial No. 596,460.

*To all whom it may concern:*

Be it known that I, NESTOR BRAIBANT, a subject of the King of Belgium, and resident of Brussels, Belgium, have invented certain new and useful Improvements in and Relating to Antifriction-Bearings for Resilient Wheels, of which the following is a specification.

This invention relates to elastic wheels and has to do more especially with that type disclosed in my application filed September 25, 1909, Serial Number 519,635, comprising a wooden rim covered by a steel rim, and yielding members interposed between both, the object of this invention being to provide ball abutments adapted to receive and neutralize the lateral thrust of the metallic cover while permitting relative motions of said rim and cover in the radial direction.

In the accompanying drawings: Figure 1 shows a cross section of one form of abutment. Fig. 2 is a side elevation view of a part of same.

In the device shown by Figs. 1 and 2 the abutment is adjusted from the outside. The cups 2 of the abutment are rigidly secured to a mounting 3 on the wooden block 17 carried by the rim and the balls 1 are in fixed relation with reference to said rim. The guide plate 7 is provided opposite the ball 1 with a circular opening the center of which registers with the point of contact of the ball. This circular opening receives a shouldered ring 21 riveted in position on the plate 7 and having its inner wall screw threaded. This ring is engaged by a screw plug 22 in the inner surface of which a disk 23 made of hard steel is secured, this disk being adapted to be engaged by the ball. It will be easily understood that it will be easy to adjust the abutment from the outside by screwing the screw plug 22 farther into the ring or by unscrewing it therefrom. To this end the screw plug 22 is provided at its end opposite to the disk 23 with a square depression 24 adapted to receive a suitable key. The adjustment of the ball abutment being completed the screw plug 22 will be prevented from rotating by a small washer 25 screwed to the outside of the guide plate 7 and provided with a projection or lug adapted to engage one of the three notches 26 provided in the screw threaded plug 22.

Having now fully described my said invention what I claim and desire to secure by Letters Patent, is:

1. In combination, a wheel, a tire structure having side plates extending on opposite sides of the wheel and in spaced relation with respect thereto, anti-friction devices extending in opposite directions from the wheel to maintain the structure in predetermined lateral relation with respect to the wheel, each side plate being apertured, a ring riveted in such aperture and having internal threads, a nut having threaded engagement with said ring and recessed on its inner face, and a hardened metal plate held in such recess by engagement with one of said anti-friction devices, substantially as described.

2. In combination, a wheel, a tire structure having tire plates extending on opposite sides of the wheel and in spaced relation with respect thereto, anti-friction devices extending in opposite directions from the wheel to maintain said structure in predetermined lateral relation with respect to the wheel, each side plate being apertured, a ring secured in each aperture and having internal threads, a nut having threaded engagement with each ring and having its inside face recessed, a hardened plate loosely fitting in said recess and engaging the adjacent anti-friction device, and locking devices for locking said nuts in adjusted position.

3. In combination, a wheel, a tire structure having plates extending on opposite sides of the wheel and in spaced relation with respect thereto, hardened plates adjustably and loosely supported by said structure plates, and anti-friction devices on the wheel engaging said hardened plates and holding the same in their adjustable support and maintaining the structure in predetermined relation with respect to the wheel, substantially as described.

In testimony whereof I have hereunto set my hand in presence of two witnesses.

NESTOR BRAIBANT.

Witnesses:
C. VAN VELSEN,
GREGORY PHELAN.

---

Copies of this patent may be obtained for five cents each, by addressing the "Commissioner of Patents, Washington, D. C."